No. 809,508. PATENTED JAN. 9, 1906.
D. C. KLINE.
LANTERN.
APPLICATION FILED DEC. 9, 1904.

WITNESSES:
Clarence W. Carroll
D. Gurnee

INVENTOR:
David C. Kline
by Osgood & Daus
his Attys

UNITED STATES PATENT OFFICE.

DAVID C. KLINE, OF ROCHESTER, NEW YORK, ASSIGNOR TO ALBERT R. PRITCHARD, THOMAS B. PRITCHARD, AND HENRY A. STRONG, ALL OF ROCHESTER, NEW YORK, THE FIRM OF PRITCHARD MANUFACTURING COMPANY.

LANTERN.

No. 809,508.　　　Specification of Letters Patent.　　　Patented Jan. 9, 1906.

Application filed December 9, 1904. Serial No. 236,155.

*To all whom it may concern:*

Be it known that I, DAVID C. KLINE, a citizen of the United States, and a resident of Rochester, in the county of Monroe and State of New York, have invented certain new and useful Improvements in Lanterns, of which the following is a specification.

This invention relates to lanterns; and it consists in the combination and parts hereinafter described and claimed.

Figure 1:
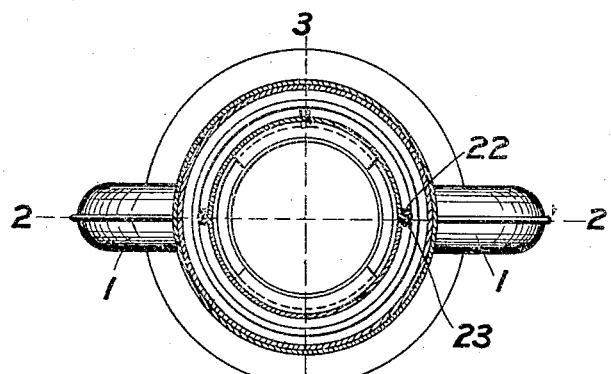
Figure 2:
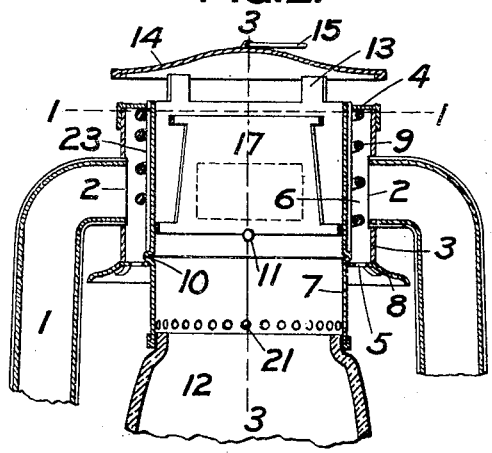
Figure 3:
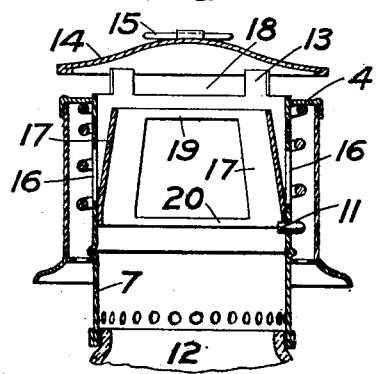

In the drawings, Figure 1 is a cross-section on the line 1 1 of Fig. 2. Fig. 2 is a vertical section of the upper part of a lantern on the line 2 2 of Fig. 1, and Fig. 3 is a cross-section of the upper part of a lantern on the line 3 3 of Figs. 1 and 2.

The side tubes 1 1 of the lantern are attached and supported in the usual manner at their lower ends and extend upward, so as to connect with perforations 2 2 in the outside of a collar 3, having a closed top 4 and open bottom 5. The bottom 5 may be pierced with holes or it may be entirely open, as desired. The chamber 6 is thus formed between the collar 3 and an inside tube 7, which is capable of vertical movement, and is guided by the tube 4 and the bottom 5 of the chamber 6. A flange 8 extends from the outer lower edge of the collar 3, preferably in a slightly-downward direction.

In the chamber 6 is a spring 9, adapted to press the tube or collar 7 downward, and its downward movement is stopped by a projection 10 striking a stop upon the stationary or outer tube or collar 3. In the present case the stop is the bottom 5 of the chamber 6, and the projection 10 is a body or swage upon the outside of the tube or collar 7. The spring 9 is fastened at 11, Fig. 3, in any suitable way to one of these collars, preferably to the inner collar 7, and the upper or free end of the spring presses against the top 4 of the chamber 6, and thus forces the collar 7 downward, so that its lower edge may surround the upper edge of the globe 12, and thus the collar 7 may constitute the globe-holder. The collar 7 is open at both ends, but has standards 13 at the upper end for supporting the cover or cap 14, having a ring or handle 15, which may be used for lifting the collar 7 to free the globe 12. The perforations 2 are diametrically opposite in the form of device shown in the circular collar 3, and air-inlet holes 16 are provided through the walls of the collar 7 at points through the collar 7 on a diameter at right angles to the diameter passing through the holes 2, so that air passing from the perforations 16 to the perforations 2 must travel nearly a quarter of a circle. Inside the tube 7 and opposite the holes 16 are deflectors 17, fastened to the tube 7 below the holes 18 and gradually diverging from the walls of the tube 7 to near the openings 18 between the top of the tube 7 and the cap 14. These deflectors are not continuous and do not form chambers in which the air may be confined. A convenient construction is to form a cone of sheet metal of suitable size to form the two deflectors and to cut out portions of it, leaving strips 19 and 20 at the bottom and top, as shown in Fig. 3. A series of holes 21 are made around the bottom of the tube 7 and just below the upper edge of the globe 12.

The operation of the device is as follows: As the hot air ascends from the lamp it rises through the tube 7 and small quantities of it enter around the ends of the deflectors 17, passing out through the holes 16 into the chamber 6 and thence down the tubes 1. With the ordinary construction of lanterns this will feed the flame with slightly-warm air. In case the lantern is violently moved upward a slight motion of air will by inertia be sent down toward the flame through the center of the tube 7. Other portions of the air between the deflectors 17 and the tube 7 will be driven out through the holes 16, and thence around through the holes 2 and down the tubes 1. Any superabundant pressure of air between the deflectors 17 and the tubes 7 will escape around the edge of the deflectors and pass downward through the lantern.

This lantern is well protected against the effect of sudden gusts of wind, and the operation just described is the important operation in that connection.

In order to keep the tube 7 from turning, and thus to contain the relative position of the air-holes 2 and 16, notches or guides 22 are cut in one or both of the top 4 and the bottom 5, connected with the outer tube 3, and in this slot run ribs 23 upon the tube 7. These ribs are vertical and parallel with the axis of the tube 7, and thus the globe-holder tube may be raised and lowered within the outer tube 3.

This construction avoids the use of windbreaks and permits a freer circulation of the air than in many, if not all, of the prior constructions.

What I claim is—

1. In a tubular lantern, a globe-holder tube having opposite perforations through its side, and deflector-plates each fastened by one edge inside said tube and opposite the said perforations and gradually diverging from the inner side of the globe-tube whereby air may pass around all the edges of the deflector-plate except the edge by which it is fastened to the globe-holder tube, an outer tube around the globe-holder tube, having opposite perforations connecting with the side tubes, the side tube perforations and the perforations through the globe-holder tube being substantially at right angles to each other.

2. In a tubular lantern, a globe-holder tube having opposite perforations through its sides and one or more vertical ribs, deflector-plates each fastened by one edge inside said tube opposite one of said perforations and gradually diverging from the inner side of the globe-holder tube, whereby air may pass around all the edges of the deflector-plate except the edge by which it is fastened to the globe-holder tube, an outer tube around the globe-holder tube having opposite perforations connecting with the air-tubes, the air-tube perforations and the perforations through the globe-holder tube being substantially at right angles to each other, one or more guides for said ribs in said outer tube, and spring means for holding the two tubes in position.

3. In a tubular lantern, air-tubes, an outer tube having opposite perforations through its sides connecting with the air-tubes, a globe-holder tube inside the outer tube having opposite perforations through its sides out of line with the perforations in the outer tube, and a deflector-plate opposite each perforation in the globe-holder tube and fastened at one edge inside said globe-holder tube and open to the interior of said globe-holder tube around its remaining edges.

In testimony whereof I have signed my name to this specification in the presence of two subscribing witnesses.

DAVID C. KLINE.

Witnesses:
  H. L. OSGOOD,
  D. GURNEE.